(12) United States Patent
Ayyagari et al.

(10) Patent No.: US 7,822,058 B2
(45) Date of Patent: Oct. 26, 2010

(54) METHOD FOR TRANSITIONING BETWEEN COORDINATION MODES FOR INTERFERING NEIGHBOR NETWORKS

(75) Inventors: Deepak Ayyagari, Vancouver, WA (US); Wai-Chung Chan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 962 days.

(21) Appl. No.: 11/089,756

(22) Filed: Mar. 23, 2005

(65) Prior Publication Data
US 2005/0193116 A1  Sep. 1, 2005

Related U.S. Application Data

(63) Continuation of application No. PCT/US2004/036786, filed on Nov. 5, 2004.

(60) Provisional application No. 60/518,036, filed on Nov. 7, 2003, provisional application No. 60/518,224, filed on Nov. 7, 2003, provisional application No. 60/518,237, filed on Nov. 7, 2003, provisional application No. 60/518,574, filed on Nov. 7, 2003, provisional application No. 60/537,492, filed on Jan. 19, 2004, provisional application No. 60/573,353, filed on May 21, 2004.

(51) Int. Cl.
 *H04J 3/16* (2006.01)
(52) U.S. Cl. .................. 370/437; 370/462; 370/465
(58) Field of Classification Search .......... 370/445, 370/461, 437, 462, 465; 455/63.1
See application file for complete search history.

(56) References Cited

U.S. PATENT DOCUMENTS

| 4,313,212 | A | 1/1982 | Whitlock |
| 5,541,955 | A | 7/1996 | Jacobsmeyer |
| 5,596,439 | A | 1/1997 | Dankberg et al. |
| 5,644,573 | A | 7/1997 | Bingham et al. |
| 5,828,963 | A | 10/1998 | Grandhi et al. |
| 5,949,769 | A | 9/1999 | Davidson et al. |
| 6,006,271 | A | 12/1999 | Grabiec et al. |
| 6,084,886 | A | 7/2000 | Dehner et al. |
| 6,097,700 | A | 8/2000 | Thornberg et al. |
| 6,167,095 | A | 12/2000 | Furukawa et al. |
| 6,233,240 | B1 | 5/2001 | Barbas et al. |
| 6,278,723 | B1 | 8/2001 | Meihofer et al. |

(Continued)

FOREIGN PATENT DOCUMENTS

JP          05-304530          11/1993

(Continued)

OTHER PUBLICATIONS

International Application No. PCT/US04/036798 International Preliminary Examination Report (Previously cited incorrectly in the Information Disclosure Statement dated Jun. 2, 2008.).

(Continued)

*Primary Examiner*—Kevin C Harper
*Assistant Examiner*—Sai-Ming Chan
(74) *Attorney, Agent, or Firm*—Krieger Intellectual Property, Inc.; Scott C. Krieger

(57) ABSTRACT

Embodiments of the present invention comprise methods and systems for establishing, managing and transitioning between network coordination modes.

12 Claims, 7 Drawing Sheets

U.S. PATENT DOCUMENTS

| | | |
|---|---|---|
| 6,278,883 B1* | 8/2001 | Choi .................. 455/552.1 |
| 6,400,819 B1 | 6/2002 | Nakano et al. |
| 6,480,506 B1 | 11/2002 | Gubbi |
| 7,180,884 B2 | 7/2003 | Elliott |
| 6,618,366 B1 | 9/2003 | Furukawa et al. |
| 6,674,750 B1 | 1/2004 | Castellano |
| 6,700,875 B1 | 3/2004 | Schroeder et al. |
| 6,718,393 B1 | 4/2004 | Aditya |
| 6,741,554 B2 | 5/2004 | D'Amico et al. |
| 6,754,176 B1 | 6/2004 | Gubbi et al. |
| 6,763,384 B1 | 7/2004 | Gupta |
| 6,795,418 B2 | 9/2004 | Choi |
| 6,826,186 B1 | 11/2004 | Ditta et al. |
| 6,850,981 B1 | 2/2005 | Ho et al. |
| 6,865,609 B1 | 3/2005 | Gibbi et al. |
| 6,877,043 B2 | 4/2005 | Mallory et al. |
| 6,891,841 B2 | 5/2005 | Leatherbury et al. |
| 6,934,554 B2 | 8/2005 | Mizuno et al. |
| 6,934,752 B1 | 8/2005 | Gubbi |
| 6,947,748 B2 | 9/2005 | Li et al. |
| 7,050,452 B2* | 5/2006 | Sugar et al. .................. 370/465 |
| 7,072,315 B1 | 7/2006 | Liu et al. |
| 7,110,366 B2 | 9/2006 | Hulyalkar et al. |
| 7,110,380 B2 | 9/2006 | Shvodian |
| 7,151,558 B1 | 12/2006 | Kogane |
| 7,233,991 B2* | 6/2007 | Adhikari ..................... 709/224 |
| 7,298,289 B1 | 11/2007 | Hoffberg |
| 7,561,539 B2 | 7/2009 | Sugaya |
| 2002/0022483 A1* | 2/2002 | Thompson et al. .......... 455/439 |
| 2002/0094011 A1 | 7/2002 | Okumura et al. |
| 2002/0133589 A1 | 9/2002 | Gubbi et al. |
| 2002/0159418 A1 | 10/2002 | Rudnick et al. |
| 2002/0163928 A1 | 11/2002 | Rudnick et al. |
| 2003/0002529 A1 | 1/2003 | Kurdzinski et al. |
| 2003/0012166 A1* | 1/2003 | Benveniste .................. 370/338 |
| 2003/0012167 A1 | 1/2003 | Benveniste |
| 2003/0012176 A1 | 1/2003 | Kondylis et al. |
| 2003/0016732 A1 | 1/2003 | Miklos et al. |
| 2003/0067892 A1 | 4/2003 | Beyer et al. |
| 2003/0081603 A1 | 5/2003 | Rune |
| 2003/0147368 A1* | 8/2003 | Eitan et al. .................. 370/338 |
| 2003/0161340 A1 | 8/2003 | Sherman |
| 2003/0169697 A1 | 9/2003 | Suzuki |
| 2003/0174665 A1 | 9/2003 | Benveniste |
| 2003/0181165 A1 | 9/2003 | Sugar et al. |
| 2003/0199279 A1 | 10/2003 | Roberts |
| 2003/0224787 A1 | 12/2003 | Gandolfo |
| 2003/0231621 A1 | 12/2003 | Gubbi et al. |
| 2004/0001429 A1 | 1/2004 | Ma et al. |
| 2004/0013102 A1 | 1/2004 | Fong et al. |
| 2004/0013135 A1 | 1/2004 | Haddad |
| 2004/0053621 A1 | 3/2004 | Sugaya |
| 2004/0058686 A1 | 3/2004 | Odman |
| 2004/0062229 A1 | 4/2004 | Ayyagari et al. |
| 2004/0100897 A1 | 5/2004 | Shattil |
| 2004/0125786 A1 | 7/2004 | Fuchs |
| 2004/0136393 A1 | 7/2004 | Riveiro Insua et al. |
| 2004/0166869 A1 | 8/2004 | Laroia et al. |
| 2004/0184398 A1 | 9/2004 | Walton et al. |
| 2004/0224676 A1 | 11/2004 | Iseki |
| 2005/0030890 A1 | 2/2005 | Benco et al. |
| 2005/0030967 A1 | 2/2005 | Ohmi |
| 2005/0192037 A1 | 9/2005 | Nanda et al. |
| 2006/0039275 A1 | 2/2006 | Walton et al. |
| 2006/0114826 A1 | 6/2006 | Brommer |
| 2006/0227706 A1 | 10/2006 | Burst, Jr. |
| 2006/0250973 A1 | 11/2006 | Trott |
| 2006/0251098 A1 | 11/2006 | Morioka |
| 2007/0211786 A1 | 9/2007 | Shattil |

FOREIGN PATENT DOCUMENTS

| | | |
|---|---|---|
| JP | 11-205352 | 7/1999 |
| JP | 2000-165930 | 6/2000 |
| JP | 2004-503181 | 1/2002 |
| JP | 2004-537875 | 6/2002 |
| JP | 2003-110571 | 4/2003 |
| JP | 2003-249936 | 9/2003 |
| WO | WO00/74322 | 12/2000 |
| WO | WO02/41586 | 5/2002 |

OTHER PUBLICATIONS

European Search Report for PCT/US 2004036797 corresponding to U.S. Appl. No. 11/089,882 which has technical similarities to the present application.

Japanese Office Action JP2007-503890 corresponding to U.S. Appl. No. 11/089,759 which has technical similarities to the present application.

Japanese Office Action JP2007-527184 corresponding to U.S. Appl. No. 11/089,756 which has technical similarities to the present application.

Japanese Office Action JP2006-538487 corresponding to U.S. Appl. No. 11/089,792 which has technical similarities to the present application.

Decision of Rejection for JP2006-538487 corresponding to U.S. Appl. No. 11/089,792 which has technical similarities to the present application.

U.S. Appl. No. 11/089,623—Non-Final Office Action dated Feb. 2, 2009 (Previously cited incorrectly in the Information Disclosure Statement dated Jun. 2, 2009.).

U.S. Appl. No. 11/089,623—Non-Final Office Action dated Mar. 16, 2010.

International Application No. PCT/US04/036797 International Search Report.

International Application No. PCT/US04/036797 International Preliminary Examination Report.

International Application No. PCT/US04/036798 International Search Report.

International Application No. PCT/US04/036799 International Preliminary Examination Report.

International Application No. PCT/US04/036799 International Search Report.

International Application No. PCT/US04/036786 International Preliminary Examination Report.

International Application No. PCT/US04/036786 International Search Report.

International Application No. PCT/US04/036796 International Preliminary Examination Report.

International Application No. PCT/US04/036796 International Search Report.

International Application No. PCT/US04/036969 International Preliminary Examination Report.

International Application No. PCT/US04/036969 International Search Report.

International Application No. PCT/US04/036785 International Preliminary Examination Report.

International Application No. PCT/US04/036785 International Search Report A.

International Application No. PCT/US04/036785 International Search Report B.

U.S. Appl. No. 11/089,882—Office Action dated May 21, 2008.
U.S. Appl. No. 11/089,792—Office Action dated Feb. 21, 2006.
U.S. Appl. No. 11/089,792—Office Action dated Mar. 28, 2006.
U.S. Appl. No. 11/089,792—Office Action dated Nov. 6, 2006.
U.S. Appl. No. 11/089,792—Office Action dated Apr. 25, 2007.
U.S. Appl. No. 11/089,792—Office Action dated Aug. 8, 2007.
U.S. Appl. No. 11/090,549—Office Action dated Dec. 12, 2007.
U.S. Appl. No. 11/089,756—Office Action dated Feb. 5, 2008.

U.S. Appl. No. 11/089,623—Office Action dated Sep. 17, 2009.
U.S. Appl. No. 11/089,759—Notice of Allowance dated Oct. 8, 2009.
U.S. Appl. No. 11/089,792—Notice of Allowance dated Jan. 28, 2008.
U.S. Appl. No. 11/090,549—Office Action dated Dec. 30, 2009.
U.S. Appl. No. 11/090,549 Office Action dated Jul. 7, 2009.
U.S. Appl. No. 11/089,882 Office Action dated Oct. 8, 2009.

European Search Report for PCT/US 2004036785 corresponding to U.S. Appl. No. 11/089,629 which has technical similarities to the present application.
Japanese Office Action JP 2006-538485 corresponding to U.S. Appl. No. 11/090,549 which has technical similarities to the present application.

* cited by examiner

Algorithm to find the INL allocations of all neighbor Beacons.

Neighbor Network Releasing Bandwidth MSC

Neighbor Network Shutdown MSC

METHOD FOR TRANSITIONING BETWEEN COORDINATION MODES FOR INTERFERING NEIGHBOR NETWORKS

CROSS-REFERENCE TO RELATED APPLICATIONS

This application is a continuation of International Patent Application No. PCT/US2004/36786 filed on Nov. 5, 2004, which claims the benefit of U.S. Provisional Patent Applications: No. 60/518,036 filed Nov. 7, 2003 entitled "OFDMA (FDM+TDM) Schedulers for OFDM PHY's"; Nos. 60/518,036 60/518,224 filed Nov. 7, 2003 entitled "Reconfiguration of Sub-Channels in an OFDM System"; No. 60/518,237 filed Nov. 7, 2003 entitled "Network Bandwidth Optimization For Channel Estimation Measurements"; No. 60/518,574 filed Nov. 7, 2003 entitled "Selection Of Fixed Versus Dynamic Modulation Settings In An OFDM System"; No. 60/537,492 filed Jan. 19, 2004 entitled "Resource Coordination Architecture For Neighboring Networks"; and No. 60/573,353 filed May 21, 2004 entitled "System Design Document For Neighbor Network Operations."

BACKGROUND OF THE INVENTION

In situations where multiple logical networks share a common communication medium or channel, the networks compete for access to the channel, (i.e., they compete for bandwidth). In the absence of any coordination between the networks, they can destructively interfere with one another, reducing capacity utilization and the bandwidth (BW) available to stations within any network.

The scenario described above may arise when neighboring homes in residential neighborhoods or apartments deploy local area networks using a common medium within their individual dwellings. Often the networks share a channel, as is the case in wireless and in powerline networks. This scenario requires a method to allow the multiple networks to coordinate sharing the communication medium with one another.

This coordination problem is currently addressed by many methods. In some cases, contention access protocols, such as CSMA and its derivatives, are employed by all stations in the multiple networks sharing the medium. Contention access protocols, however, have been shown to be inefficient in providing QoS guarantees to AV and streaming applications which are increasingly popular.

In other cases, a central controller arbitrates among the multiple networks in deciding how the total available BW is apportioned. This centralized decision making scheme can cause large delays and incur heavy messaging overhead as the number of neighboring networks grows.

In some other cases, a distributed approach is used where each network coordinates and shares the available BW with its immediate neighboring networks only. There is no central authority that arbitrates among network devices. There is no chaining effect where a network has to coordinate with networks multiple hops away. This distributed method allows neighbor networks to have contention-free access of the channel and therefore improves capacity over contention access protocols.

No single method alone can solve the coordination problem efficiently under all network scenarios. Further, each method has limitations, which may not be acceptable. For example, any coordination method involving explicit message exchanges between Controllers in networks creates security issues.

BRIEF SUMMARY OF THE INVENTION

Embodiments of the present invention comprise systems and methods for transitioning between network coordination modes when network conditions change.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF PREFERRED EMBODIMENTS

Figure 1A:
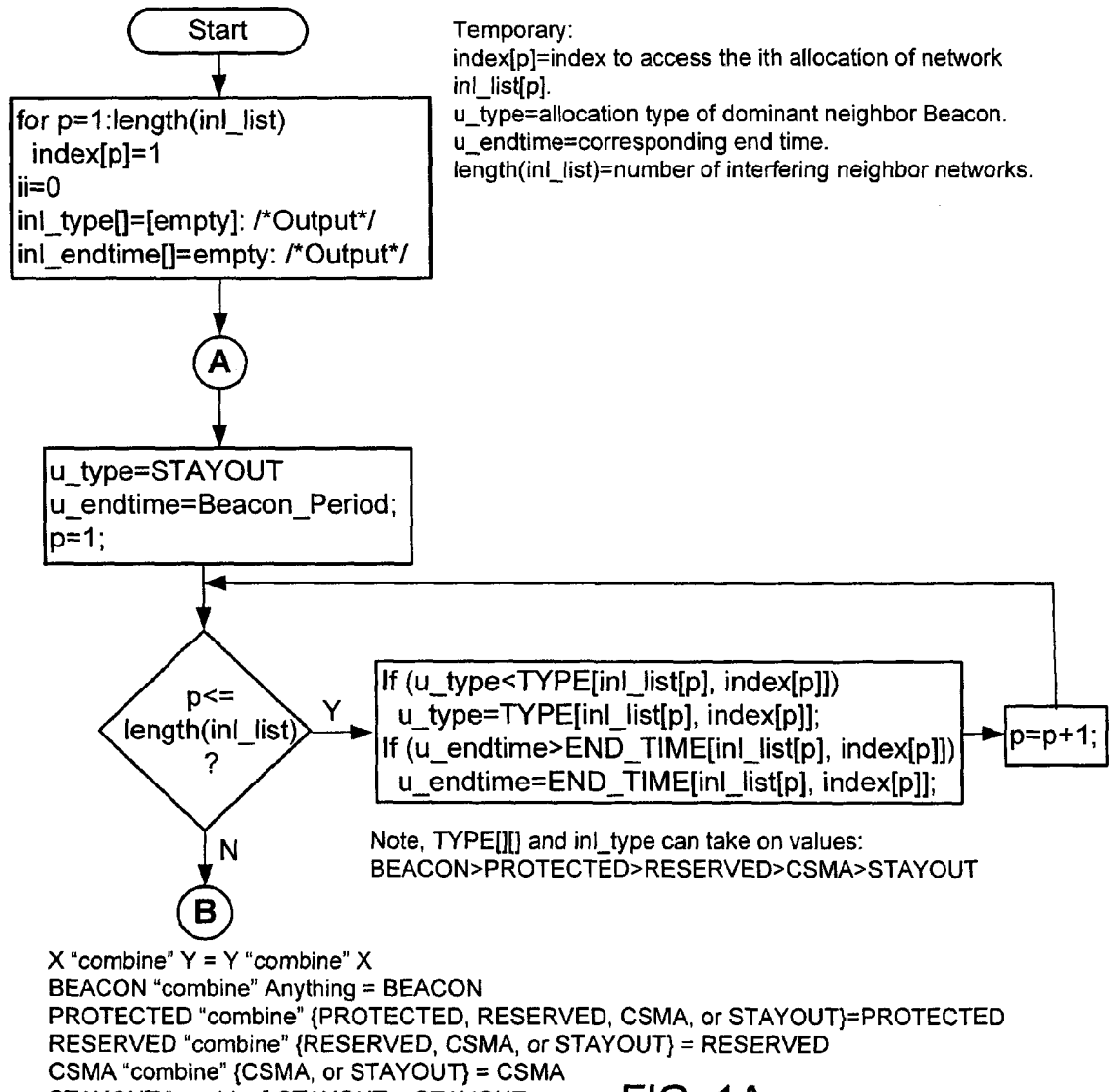
FIG. 1A is a chart depicting an exemplary method for finding INL allocations.

Different network coordination modes handle various network conditions better than others. For example, when the number of networks is small, a distributed approach with contention-free access of the channel may perform better than other alternatives. Neighboring networks can coordinate with each other and share the available BW without colliding with each other and while providing QoS guarantees. Network coordination does not come free. Explicit message exchange between networks is typically required to achieve network coordination. Alternatively, broadcast transmissions (such as Beacons) may be modified to convey the additional network coordination information.

When the number of networks is large, the overhead required to achieve network coordination with contention-free access typically uses up a large portion of the capacity of the channel. In some cases, little capacity is left for the transmission of actual user traffic. When this occurs, contention access protocols may be more suitable for solving the coordination problem. Contention access protocols generally work well when the number of network nodes is large and a mechanism is present to adapt to network congestion.

Embodiments of the present invention comprise an approach where different network coordination solutions can be applied to a group of networks when network conditions will benefit from the different solutions. In some embodiments, contention access protocols and distributed, contention-free, coordination methods, can be used under different network conditions. In particular embodiments, networks may transition to different "Modes" depending on such parameters as the number of neighbor networks, signal-to-noise level, interference level, number of active devices in each network and other parameters. Mechanisms or triggers to switch between different network coordination solutions are utilized.

In some embodiments of the present invention, each network has a controlling authority, which may be referred to as a Quality of Service Controller (QoS Controller or QoSC). In these embodiments, there is typically one instance of a QoSC in each network. The QoSC manages the activities of devices within its network and performs functions such as BW allocation to connections. In some embodiments, a time domain multiple access scheme is used where the networks share bandwidth by operating in different segments of a time frame.

In some embodiments, the QoSC of each network may broadcast a Beacon. The period in which a network broadcasts its Beacon is called the Beacon Cycle. Information is present in the Beacon to convey the current mode of operation of a network to its neighbor networks. A Beacon may also comprise other information such as network allocation data.

Embodiments of the present invention employ various network coordination and control methods and transition between those methods as network conditions dictate. In an exemplary embodiment, each network can be in one of the following three modes of operation:
1. Uncoordinated Mode (or stand-alone mode).
2. Coordinated Mode.
3. Controlled CSMA Mode.

Uncoordinated Mode and Coordinated Mode are network coordination solutions that provide each network with contention-free access to the channel. On the other hand, Controlled CSMA Mode is a network coordination solution that provides each network with contention access to the channel. Various algorithms may be used in each of these three modes of operation. For example, a centralized algorithm, a distributed algorithm with message exchange, or a distributed algorithm without message exchange could be used in the Coordinated Mode.

In some embodiments, the following operation modes may be used.

Uncoordinated Mode

This mode may be used when a network does not detect other neighbor networks using the same channel. The QoSC of the network is free to make any BW assignments without consulting with QoSCs of other networks. This is the same as a stand-alone mode where the network operates independent of external factors like other interfering networks.

For example, the TDMA frame can be made up of contention-free periods, and contention periods. User data that requires a QoS guarantee may be transmitted during contention-free periods, while other low priority traffic may be transmitted during contention periods using contention access protocols such as CSMA.

Coordinated Mode

This mode is used when a network detects other neighbor networks. In this mode, each QoSC shares BW with its immediate neighbors in a contention-free fashion. For example, messages can be exchanged between QoSCs so that when one network is using the channel, all interfering networks will not transmit. Coordination between neighbor networks can also be achieved, without explicit message exchange between QoSCs, by conveying additional information inside the Beacons.

In some embodiments, a TDMA frame may be divided into a Beacon region (where Beacons from each network are transmitted), several reserved regions and one or more contention periods. Each reserved region is to be used by a network for its data that require a QoS guarantee. Interfering neighbors will not transmit in the same interval. However, the reserved regions of two non-interfering networks are allowed to overlap with each other thereby providing a higher total capacity. Contention periods are shared by all networks for transmission of low priority data or data that do not require a QoS guarantee.

When neighbor networks are operating in the Coordinated Mode, the values of their Beacon Cycles may be coordinated and each QoSC may be set to broadcast its Beacon once per Beacon Cycle.

Controlled CSMA Mode

This mode may be used when a network detects too many interfering networks, or when a network running in the Uncoordinated Mode or Coordinated Mode experiences a high noise or interference level. In this mode, BW may be shared between neighbor networks using contention access protocols such as CSMA, instead of in a contention-free fashion.

In order to reduce the overhead used in broadcasting Beacons, Beacon generation in Controlled CSMA Mode is distributed. A QoSC may schedule to broadcast a Beacon during a small random period of the Beacon Cycle. Moreover, the QoSC may cancel its Beacon transmission attempt if it receives a Beacon from a neighbor network earlier in the same Beacon Cycle. Note that it is possible that two or more Beacons are transmitted at the same time, resulting in a collision. Therefore, in each Beacon Cycle, there can be zero or at most one Beacon.

The TDMA frame may divided into a small region of random duration (where a Beacon from at most one network can be transmitted successfully), a "controlled" contention period, and a (normal) contention period. The controlled contention period is used for data transmission that requires a QoS guarantee and is shared by all networks. Admission control can be performed by each network to ensure the total traffic load during the controlled contention period is acceptable. The (normal) contention period is shared by all networks for transmission of low priority data or data that do not require a QoS guarantee.

In specific embodiments that comprise two or more of the exemplary three modes described above, transition methods may be used to switch between the different modes of operations. The following transition methods may be used in embodiments of the present invention.

Transition from Coordinated Mode to Uncoordinated Mode

A QoSC is in the Coordinated Mode because it detects other Beacons. When the QoSC no longer detects any other Beacons for several Beacon Cycles in a row, it may assume that all the other networks have been powered off. The QoSC may then transition to the Uncoordinated Mode.

Transition from Uncoordinated Mode to Coordinated Mode

A QoSC may be in the Uncoordinated Mode because it does not detect any other Beacons. When the QoSC detects other Beacons (because, for example, another QoSC has just established a new network), it may transition to the Coordinated Mode. The QoSC may then set its BW assignments to make them compatible with those of other networks.

Transition from Coordinated Mode or Uncoordinated Mode to Controlled CSMA Mode

One trigger for the transition to the Controlled CSMA Mode is when the number of neighbor networks exceeds a pre-determined value. For example, when the number of networks is large, the duration of the Beacon Region may occupy a large portion of the Beacon Cycle. Similarly, dividing the TDMA frame into too many reserved regions may be inefficient because of the overhead required to specify the BW assignments for the reserved regions. As a result, the network may transition to the Controlled CSMA Mode to make network coordination more efficient.

Another trigger is when the QoSC finds that the noise level is too high and performance degrades for many Beacon Cycles. The QoSC may monitor the channel to determine the performance. For example, during its reserved region, the QoSC can check to see if the Frame Control of a data transmission can be decoded correctly. (The Frame Control of a data transmission may be encoded and modulated in such a way that every device in the network is able to decode it.)

If there are too many transmission errors in its reserved region, the QoSC may first move the reserved region to another location. If the problem persists, the QoSC may transition to the Controlled CSMA Mode.

Provided that the number of networks is small, the transition to the Controlled CSMA Mode may rarely happen. As long as the neighbor Beacons can be decoded correctly by each QoSC, the QoSCs should be able to set their BW assignments appropriately to eliminate collisions of reserved regions.

Transition from Controlled CSMA Mode to Uncoordinated Mode or Coordinated Mode

When the QoSC is in the Controlled CSMA Mode, it may monitor the channel to find out the average channel usage (e.g. number of successful transmissions) over a number of Beacon Cycles. If the channel usage is high, it means that there is a lot of traffic from its own stations and from stations in other networks. The QoSC shall remain in the Controlled CSMA Mode.

The QoSC may also schedule to stop all transmissions in its network once every certain number of Beacon Cycles. During this silent cycle, the QoSC may detect for neighbor Beacons. If no Beacons are detected during the silent cycle and the channel usage is smaller than a threshold, then the QoSC may transition out of the Controlled CSMA Mode into the Uncoordinated Mode. If neighbor Beacons are detected during the silent cycle and the channel usage is smaller than a threshold, the QoSC shall transition to the Coordinated Mode.

Elements of Exemplary Embodiments

Interfering Network List

Each network central controller (CCo) may maintain an Interfering Network List (INL). The INL of a CCo (or of a Base Station Set, BSS) comprises a list of BSSs that interfere with the BSS controlled by the CCo. When multiple BSSs are operating in the Coordinated Mode, each BSS must share bandwidth with other BSSs in its INL.

Neighbor Network Operation Modes

A BSS may operate in one of the following three modes:
Uncoordinated Mode (or Stand-alone Mode)
Coordinated Mode
CSMA Mode The Network Mode (NM) field in the Frame Control of the Beacon MPDU indicates the mode of operation of the BSS.

Uncoordinated Mode

A new CCo shall establish a BSS in the Uncoordinated Mode if it cannot detect any Beacons reliably. This can happen either because there are no existing networks in the vicinity of the new CCo or because there are existing networks but the new CCo is not able to detect any of the Beacons reliably. A CCo operating in the Uncoordinated Mode shall generate its own timing and transmit its periodic Beacon independently of other networks.

In Uncoordinated Mode, QoS can be guaranteed by allocating dedicated Contention-Free Regions to applications that require QoS.

Coordinated Mode

A new CCo may establish a BSS in the Coordinated Mode if it can detect Beacons reliably from at least one existing BSS. The new CCo shall acquire the timing of the existing BSSs, and join the existing BSSs to form a Group. A Group (of BSSs) is defined as a collection of one or more BSSs with the same system timing. That is, the Time Division Multiple Access (TDMA) frame boundary of each BSS in the same Group coincides with the other.

In Coordinated Mode, CCos of neighboring BSSs may share bandwidth with each other such that QoS can be guaranteed within each BSS by the use of Contention-Free Regions (or Reserved Regions).

In Coordinated Mode, the Regions MMENTRY of each Beacon in the Group shall be compatible with each other. For example, if a BSS specifies a Contention-Free Region and an interfering BSS specifies a Stayout Region in the same interval, then the two schedules are said to be compatible. On the other hand, if a BSS specifies a Contention-Free Region and an interfering BSS specifies a CSMA Region, then they are said to be incompatible.

CSMA Mode

A new CCo shall establish a BSS in contention mode, such as Carrier Sense Multiple Access (CSMA) Mode, if there are too many existing BSSs and a new Beacon Slot cannot be created to accommodate a new network. A BSS running in the Coordinated Mode or Uncoordinated Mode may also switch to the CSMA Mode when it experiences a high noise and interference level. If the BSS was originally in the Coordinated Mode, it will stop participating and leave the Group.

If a BSS is in the CSMA Mode, the CCo shall transmit a Beacon in a random location using the CSMA/CA protocol once every Beacon Period. The CSMA Mode is used when a BSS can no longer reliably communicate with its own stations or other existing BSSs. Since the Beacons are transmitted "randomly" in the CSMA Mode, it is expected that, with a high probability, the Beacons will not collide with transmissions from other BSSs.

In CSMA Mode, the Regions MMENTRY of the Beacon shall specify a Beacon Region with one Beacon Slot and the remaining of the Beacon Period shall be specified as a CSMA Region.

Overview of Exemplary TDMA Frame Structure

A TDMA frame may comprise the following five regions. Its structure is specified in the Regions MMENTRY of the Beacons.

Beacon Region: The Beacon Region consists of one to a maximum of MaxBeaconSlot Beacon Slots. The duration of each Beacon Slot is equal to the sum of the duration of a Beacon PPDU and the required inter-frame space. Each CCo transmits a Beacon in one of the Beacon Slots every Beacon Period. The NumSlots, SlotID, and SlotUsage fields in the Beacon Frame Control and Beacon MPDU payload are used to specify the Beacon Region structure of a BSS.

CSMA Region (or Contention Period): Stations in a BSS are allowed to contend for the channel with other stations using CSMA/CA in this region. Communication between two or more interfering BSSs is possible if they have an overlapping CSMA Region. Each BSS must ensure that it maintains a minimum duration of overlapping CSMA Region with each of its interfering BSS.

Contention-Free Region (or Reserved Region): A Contention-Free Region is a time interval that is reserved by a BSS for its contention-free links. A BSS may have any number of Contention-Free Regions in a Beacon Period. A Schedule MMENTRY is used to provide the details of all the contention-free links in the Contention-Free Regions. When a BSS specifies a Contention-Free Region in a certain time interval, all its interfering BSSs shall specify a Stayout Region (to be defined next) in the same interval. Note that it is possible to have two non-interfering BSSs specify a Contention-Free Region in the same interval. This results in channel reuse with a higher total capacity.

Stayout Region: A BSS shall specify a Stayout Region if one or more of the neighboring BSSs in its INL have specified a Reserved Region or a Protected Region (to be defined next) in the same interval. Stations in the BSS are not allowed to transmit in a Stayout Region.

Protected Region: When a CCo detects the existence of another Group (with a different timing), it shall specify a Protected Region in the same interval where the Beacon Region of the other Group is located. Stations in a BSS are not allowed to transmit in a Protected Region.

TABLE 1

Exemplary interaction between different regions.

| Owner CCo | Neighbor Coordinator that hears the owner and is in the same Group | Neighbor Coordinator that hears the owner and is in a different Group |
|---|---|---|
| BEACON | BEACON | PROTECTED |
| PROTECTED | PROTECTED or STAYOUT | BEACON |
| RESERVED | STAYOUT | STAYOUT |
| CSMA | CSMA or STAYOUT | CSMA or STAYOUT |

Determining a Compatible Schedule

If the new CCo establishes a new BSS in the Uncoordinated Mode, initially it shall specify a Beacon Region with one Beacon Slot and a CSMA Region for the remaining of the Beacon Period.

On the other hand, if the new CCo joins an existing Group of BSSs in the Coordinated Mode, the schedule of its Beacon must be compatible with the schedules of the existing BSSs in its INL. The rules to determine a compatible schedule are given in this Section. First, the new CCo shall find out the combined effect of the schedules of all the BSSs in its INL, called the INL allocation.

Once the INL allocation is computed, the rules used by a new CCo to set the Region Types of the Regions MMENTRY are as follows. Initially, the new CCo shall not specify any Contention-Free Periods.

If the INL allocation is a Beacon Region, then the new CCo shall specify a Protected Region, except if it is the first entry of the INL allocation, in which case the new CCo shall also specify a Beacon Region.

Else if the INL allocation is a Protected Region or a Reserved Region, then the new CCo shall specify a Stayout Region.

Otherwise, the new CCo shall specify a CSMA Region in all other intervals.

Once a BSS is established in the Coordinated Mode, the rules used by an existing CCo to set the subsequent Region Types of the Region's MMENTRY are as follows.

If the INL allocation is a Beacon Region, then the existing CCo shall specify a Protected Region, except if it is the first entry of the INL allocation, in which case the existing CCo shall also specify a Beacon Region.

Else if the INL allocation is a Protected Region or a Reserved Region, then the existing CCo shall specify a Stayout Region.

Else if the INL allocation is a CSMA Region, then the existing CCo shall specify a CSMA Region. The existing CCo may propose to use this time interval in the future.

Else if the INL allocation is a Stayout Region, then the existing CCo may specify a CSMA Region or a Reserved Region. The existing CCo may propose to use this time interval in the future.

Computing the INL Allocation

The CCo shall decode the Beacons of all the BSSs in its INL and compute the combined effect of their allocations, called the INL allocation. For example, if one neighbor BSS in the INL specifies a Contention-Free Region (i.e., a Reserved Region) and another neighbor specifies a CSMA or Stayout Region, then the resultant INL allocation is a Reserved Region, because a Reserved Region "outweighs" both CSMA and Stayout Regions.

Figure 1B:
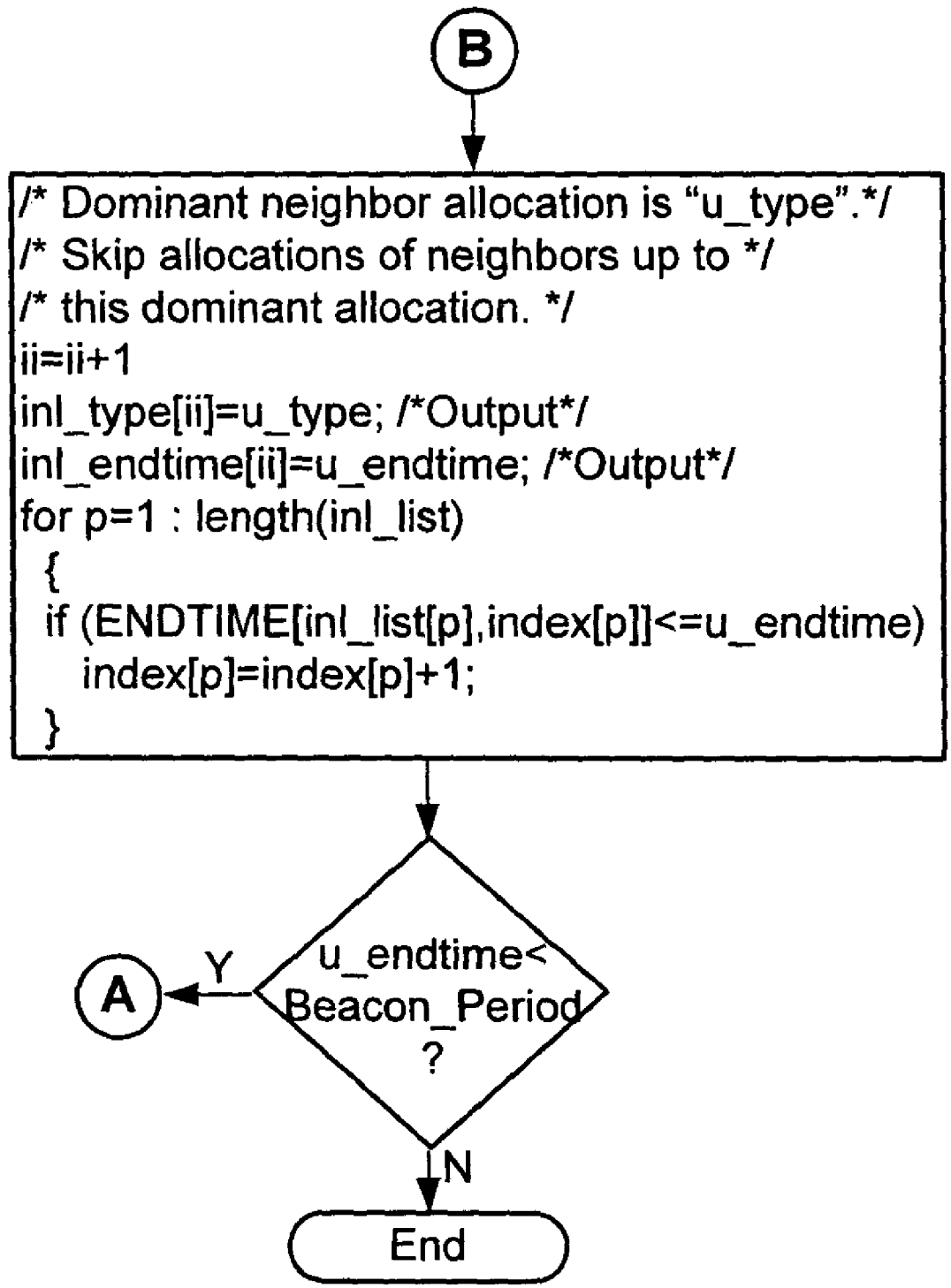
FIG. 1B is a chart depicting an exemplary method for finding INL allocations.

An exemplary algorithm used by a CCo to compute its INL allocation is given in FIG. 1. Note that in the algorithm, it is assumed that numeric values are assigned to BEACON, PROTECTED, RESERVED, CSMA, and STAYOUT and the values are such that BEACON>PROTECTED>RESERVED>CSMA>STAYOUT in order to make the flowchart simpler. It has nothing to do with the Region Type (RT) field defined in the Regions MMENTRY.

The inputs of the algorithm, TYPE[n][i] and ENDTIME[n][i], are obtained from the Region Type (RT) and Region End Time (RET) fields of the Regions MMENTRY of all neighbor Beacons, where "n" represents which neighbor network, and "i" represents which schedule for that neighbor network. The entries, TYPE [n][ ] and ENDTIME[n][ ], for each network shall be shifted, if necessary, to account for any difference in system timing.

The rules in determining the INL allocation are summarized in Table 2. The CCo concerned has two interfering BSSs in its INL, namely networks A and B. The Regions MMENTRY of network A and network B are given in the first and second column of Table 2. The resultant INL allocation is given in the third column.

TABLE 2

Rules for computing INL allocation

| Region Type of neighbor A | Region Type of neighbor B | INL allocation of neighbors A and B |
|---|---|---|
| BEACON | BEACON, PROTECTED, RESERVED, CSMA, or STAYOUT | BEACON |
| PROTECTED | BEACON | BEACON |
| PROTECTED | PROTECTED, RESERVED, CSMA, or STAYOUT | PROTECTED |
| RESERVED | BEACON | BEACON |
| RESERVED | PROTECTED | PROTECTED |
| RESERVED | RESERVED, CSMA, or STAYOUT | RESERVED |
| CSMA | BEACON | BEACON |
| CSMA | PROTECTED | PROTECTED |
| CSMA | RESERVED | RESERVED |
| CSMA | CSMA, or STAYOUT | CSMA |
| STAYOUT | BEACON | BEACON |
| STAYOUT | PROTECTED | PROTECTED |
| STAYOUT | RESERVED | RESERVED |

TABLE 2-continued

Rules for computing INL allocation

| Region Type of neighbor A | Region Type of neighbor B | INL allocation of neighbors A and B |
| --- | --- | --- |
| STAYOUT | CSMA | CSMA |
| STAYOUT | STAYOUT | STAYOUT |

Requirements of the Exemplary Embodiments

Each BSS shall specify a minimum duration of CSMA Region, denoted by the parameter MinCSMARegion, in a TDMA frame. This CSMA Region allows new STAs to associate with the CCo, existing STAs to exchange management messages with the CCo (e.g., to set up a new link), and new CCos to exchange management messages to establish new neighbor networks.

When multiple BSSs are operating in the Coordinated Mode, each BSS shall have a minimum overlapping (or common) CSMA Region, denoted by the parameter MinOverlapCSMARegion, with each of its neighbor BSS in the INL. This overlapping CSMA Region allows message exchange between the CCo and the Neighbor Coordinator (NCo) to share bandwidth.

Power-Up Procedure

When a CCo-capable STA is powered up, it shall perform the following steps either to join an existing BSS or to form a new BSS.

The new STA scans and decodes all Beacons for a period of time that is uniformly distributed between MinScanTime and MaxScanTime.

If Beacons cannot be detected and decoded reliably,
   The new STA shall become a CCo and form a new independent BSS in the Uncoordinated Mode.
   The power-up procedure is completed.
Else if Beacons can be detected and decoded reliably,
   The new STA shall attempt to associate with the existing BSSs.
   If the new STA associates successfully with one of the existing BSSs, the power-up procedure is completed.
   Else if the new STA fails to associate with any of the existing networks, then
      If there are fewer than MaxBeaconSlot Beacon Slots in the Beacon Region of each of the existing BSS, or the new CCo can find a vacant Beacon Slot to use, the new STA shall become a CCo and form a new BSS in the Coordinated Mode. The power-up procedure is completed.
      Otherwise, the new STA shall become a CCo and form a new BSS in the CSMA Mode. The power-up procedure is completed.

Procedure to Establish a New BSS in Coordinated Mode

Suppose that the new CCo has failed to associate with any of the existing BSSs, and that there are fewer than MaxBeaconSlot Beacon Slots in the Beacon Region of each of the existing BSS, or the new CCo can find a vacant Beacon Slot to use.

The new CCo may optionally exchange the NN_INL_REQ and NN_INL_RSP messages with the NCos in its INL to find out the INLs of its NCos. This step may be useful to determine whether the NCos of the new CCo can detect each other.

The new CCo shall send the NN_NEW_NET_REQ message to each of the NCos in its INL to request to establish a new BSS in the Coordinated Mode. The message shall be unencrypted and be sent in the CSMA Region specified by the Region MMENTRY of each NCo's Beacon. The NN_NEW_NET_REQ message contains the Beacon Slot number that the new CCo plans to use to transmit its new Beacons. If the Beacon Slot specified does not exist, the NN_NEW_NET_REQ message also implicitly requests the NCo to increase the size of the Beacon Region appropriately, subject to the maximum of MaxBeaconSlot Beacon Slots in a Beacon Region. The new CCo also specifies the new TDMA frame structure that it proposes to use in the NN_NEW_NET_REQ message.

The NCo shall reply the new CCo with the NN_NEW_NET_RSP message. If the request to establish a new BSS is accepted by the NCo, a successful result code shall be returned in the message. The NCo shall also change the Regions MMENTRY and the NumSlots, and SlotUsage fields of its Beacon to reflect any changes in the schedule and the Beacon Region. Otherwise, an unsuccessful result code shall be returned instead.

When the new CCo has received responses from all the NCos in the INL, it shall send the NN_NEW_NET_CFM message to the NCos in the INL. If all the NCos have replied with a successful result code in the NN_NEW_NET_RSP message, then the status field of the NN_NEW_NET_CFM message shall be set to "Go" to confirm that the new CCo is going to establish a new BSS.

If one or more NCos have replied with an unsuccessful result code in the NN_NEW_NET_RSP message, then the status field of the NN_NEW_NET_CFM message shall be set to "Cancel" to inform the NCos that the request has been cancelled. In this case, the CCo shall send the NN_NEW_NET_CFM message only to those NCos that have replied with a successful result code in the NN_NEW_NET_RSP message.

Figure 2:
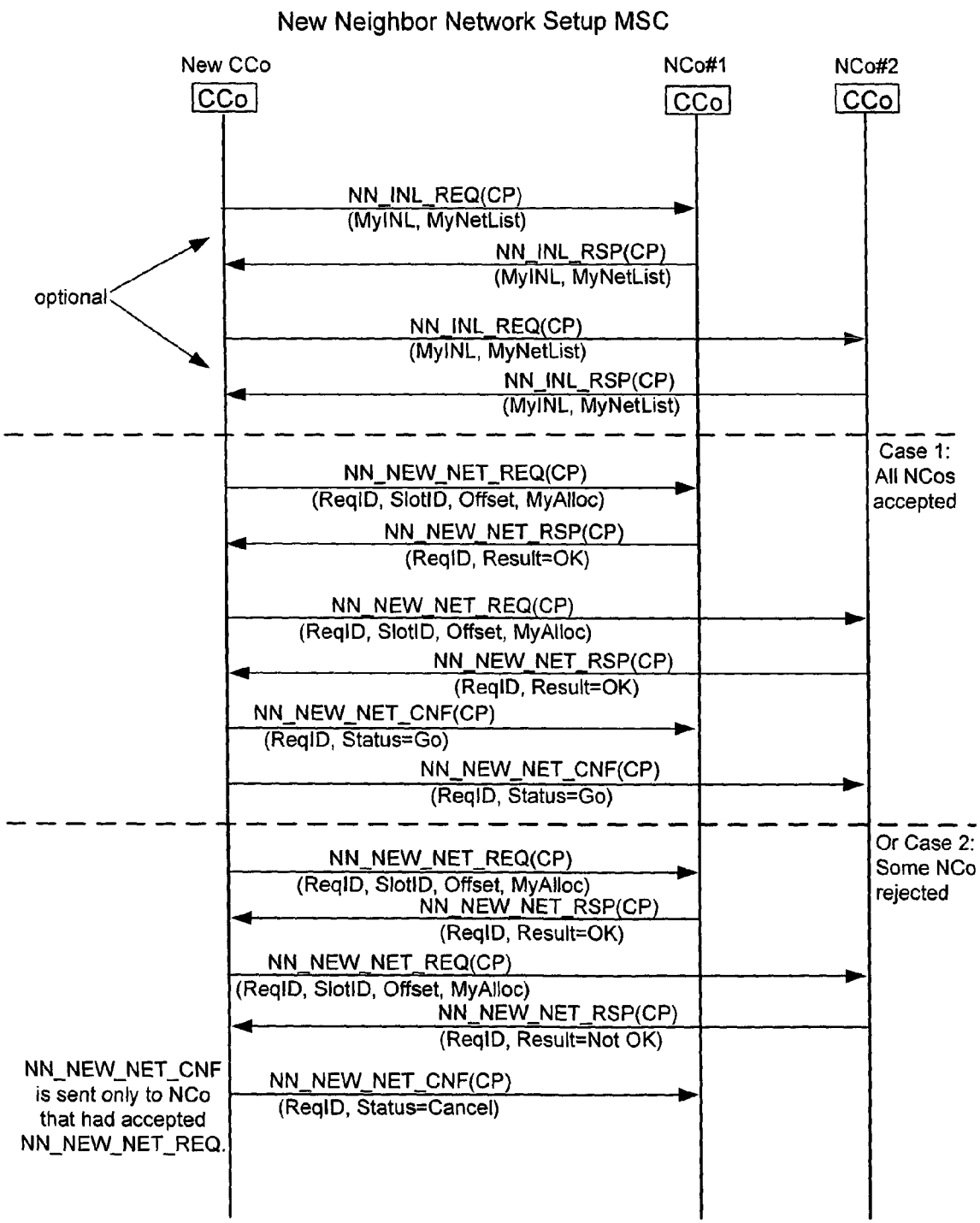
FIG. 2 is a chart depicting an exemplary method for new neighbor network setup.

An example is shown in FIG. 2. The new CCo can decode Beacons from two existing CCos (NCo 1 and NCo 2). In Case 1, both NCo #1 and NCo #2 accept the new CCo's request to set up a new BSS. In Case 2, NCo #2 rejects the request.

Two Groups of BSSs

Figure 3:
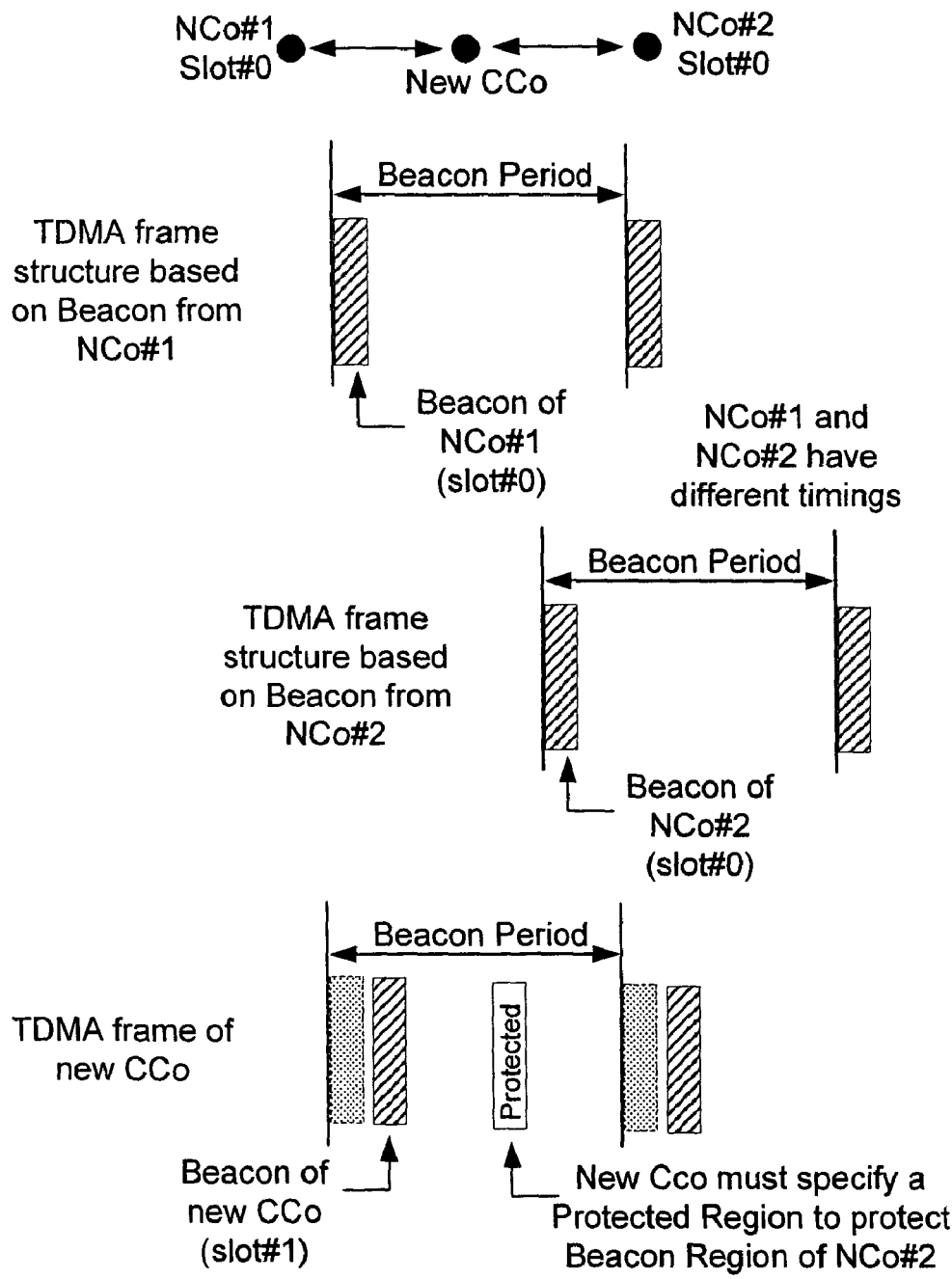
FIG. 3 is a chart depicting an exemplary method for deciding between two groups of neighboring BSSs.

It is possible that a new CCo can detect two or more Groups in the vicinity of each other. An example is shown in FIG. 3.

There are two existing BSSs (NCo #1 and NCo #2) which cannot detect each other's Beacons. Therefore, there may be a fixed time offset between their TDMA frame boundaries. A new CCo is powered up, which wants to start a new network. The new CCo is able to detect and decode the Beacons from both NCo #1 and NCo #2. Since the timings of the two existing BSSs are different, the new CCo shall acquire only one of the two timings.

In the example, the new CCo chooses the same timing as NCo #1. When the new CCo sends the NN_NEW_NET_REQ message to NCo #2, the Offset field is set to a non-zero value to indicate that the proposed timing of the new CCo is different from that of NCo #2.

Even though, BSSs in one Group have different system timing from the BSSs in another Group, the schedules of one BSS must still be compatible with each interfering BSS. In the example, the new CCo shall specify a Protected Region in the same interval where NCo #2 has specified a Beacon Region.

Use of Dummy Beacon Message

The new CCo transmitting the new Beacon may or may not know the existence of other existing BSSs with a different timing. If the new CCo specifies a Protected Region that coincides with the Beacon Region of an existing BSS, it means that the new CCo knows of the existence of that Group. No further action is required by the existing CCo in this case.

On the other hand, if the new CCo does not specify a Protected Region in the same interval where the Beacon Region of an existing BSS is located, it means that the new CCo does not know of the existence of that existing CCo. The existing CCo shall send a Dummy Beacon message to the new CCo. The purpose of this message is to inform the new CCo of the existence of an existing Group and the offset between the two Beacon Regions.

Upon receiving the Dummy Beacon message, the new CCo shall specify a Protected Region in its Regions MMENTRY to protect the Beacon Region of the existing Group. As a result, both the existing CCo and the new CCo will be able to detect the Beacons of each other.

Procedure to Establish a New BSS in CSMA Mode

During a power-up procedure, suppose that the new CCo has failed to associate with any of the existing BSSs, and that it cannot establish a new BSS in the Coordinated Mode.

The new CCo shall send the NN_NEW_NET_REQ message to each of the NCos in its INL to request to establish a new BSS in the Coordinated Mode. The message shall request for an invalid Beacon Slot for the new BSS. That is, the Beacon Slot number requested shall be greater than MaxBeaconSlot. This message notifies the NCos that the new CCo is going to establish a new BSS in CSMA Mode.

The NCos shall then reply with the NN_NEW_NET_RSP message with an unsuccessful result code.

The new CCo shall then start transmitting a Beacon in a random location using the CSMA/CA protocol once every Beacon Period. The Regions MMENTRY in the Beacon shall specify a Beacon Region with one Beacon Slot and the remaining of the Beacon Period shall be specified as a CSMA Region.

Procedure to Share Bandwidth in Coordinated Mode

The procedure to share bandwidth between neighboring BSSs operating in Coordinated Mode is described in this Section.

The (source) CCo that requests to share new bandwidth with the NCos in its INL shall first determine new time interval(s) that it desires to reserve.

The CCo shall send the NN_ADD_ALLOC_REQ message to each of the NCos in its INL. The message contains the additional time interval(s) that the source CCo is requesting.

If the bandwidth request is accepted, the NCo shall reply with the NN_ADD_ALLOC_RSP message with a successful result code. The NCo shall also change the Regions MMENTRY of its Beacon to reflect the changes in the schedule. Otherwise, the NN_ADD_ALLOC_RSP message with an unsuccessful result code is returned.

When the CCo has received responses from all the NCos in the INL, it shall send the NN_ADD_ALLOC_CFM message to the NCos in the INL. If all the NCos have replied with a successful result code in the NN_ADD_ALLOC_RSP message, then the status field of the NN_ADD_ALLOC_CFM message shall be set to "Go" to confirm that the CCo is going to reserve the time interval.

If one or more NCos have replied with an unsuccessful result code in the NN_ADD_ALLOC_RSP message, then the status field of the NN_ADD_ALLOC_CFM message shall be set to "Cancel" to inform the NCos that the request has been cancelled. In this case, the CCo shall send the NN_ADD_ALLOC_CFM message only to those NCos that have replied with a successful result code in the NN_ADD_ALLOC_RSP message. Upon receiving the NN_ADD_ALLOC_CFM message with a "Cancel" status field, the NCo shall change the Regions MMENTRY of its Beacon to the original value.

Figure 4:
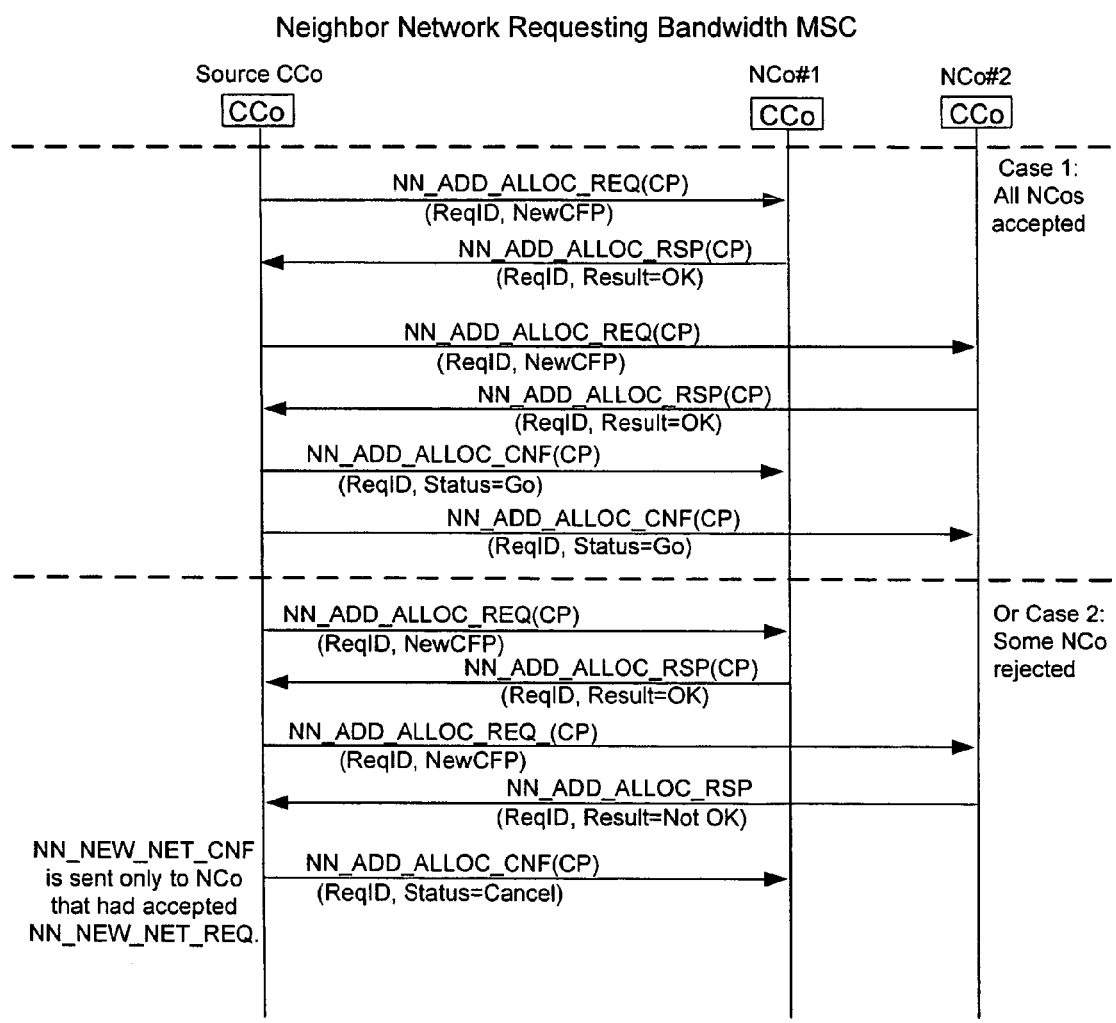
FIG. 4 is a chart depicting an exemplary method for requesting bandwidth.

An example is shown in FIG. 4. The CCo is operating in the Coordinated Mode with two other CCos (NCo #1 and NCo #2). In Case 1, both NCo #1 and NCo #2 accept the CCo's request for additional bandwidth. In Case 2, NCo #2 rejects the request.

Procedure to Release Bandwidth

Figure 5:
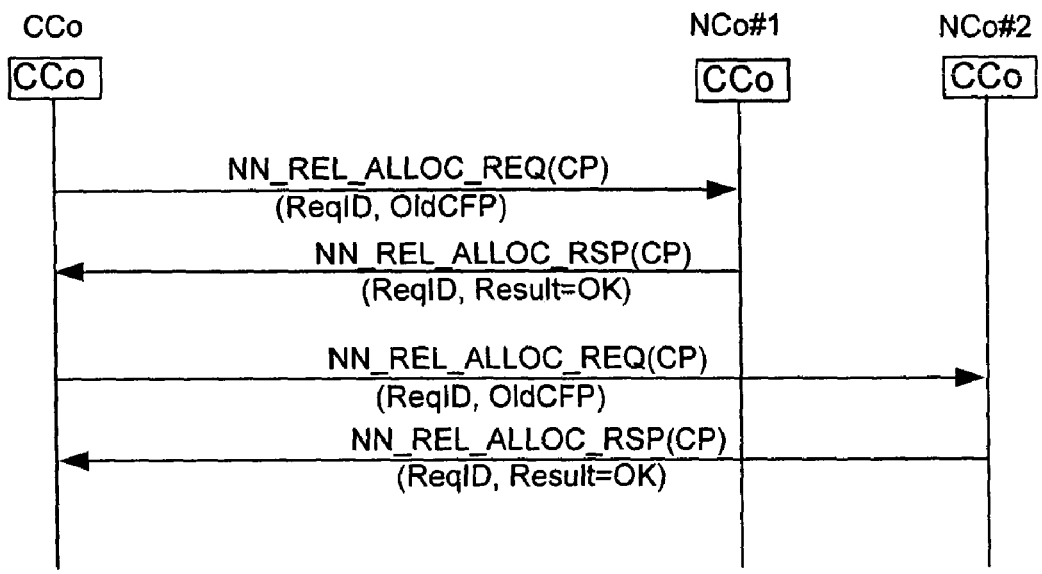
FIG. 5 is a chart depicting an exemplary method for releasing bandwidth.

The procedure to release a Reserved Region or a portion of it is shown in FIG. 5. The CCo that is releasing a reserved time interval shall send the NN_REL_ALLOC_REQ message to each NCo in its INL. The message specifies the time interval that is being released by the CCo. Each NCo shall reply with a NN_REL_ALLOC_RSP message.

Procedure to Shut Down a BSS

Figure 6:
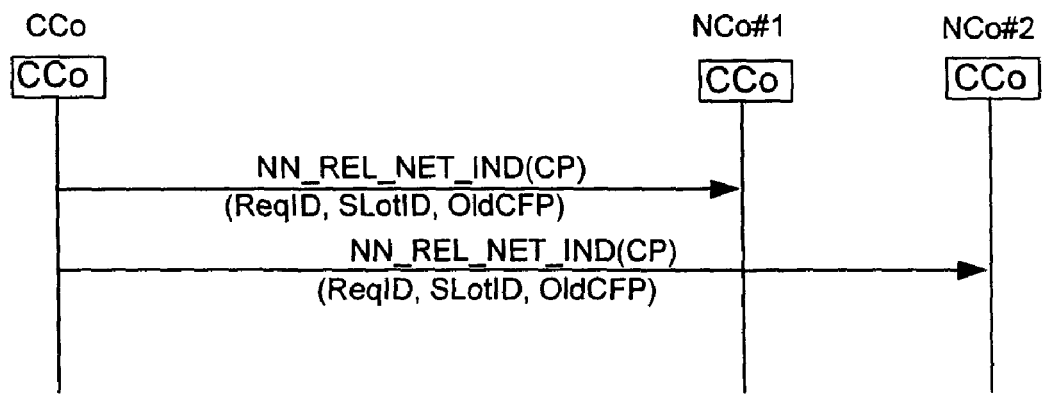
FIG. 6 is a chart depicting an exemplary method for network shutdown.

The procedure to shut down a BSS is shown in FIG. 6. The CCo that is shutting down its BSS shall send the NN_REL_NET_IND message to each NCo in its INL. The message specifies the Beacon Slot being used and the locations of the Contention-Free Regions that have been reserved by the CCo.

Scheduling Policy

When a CCo proposes a new allocation to the NCos in its INL, the following scheduling policy shall be enforced.
1. A CCo shall specify a Stayout Region in the same interval that is reserved by one or more of its NCos.
2. Each CCo shall maintain a CSMA Region of duration greater than or equal to MinCSMARegion in each Beacon Period.
3. Each CCo shall maintain an overlapping Contention Period of duration greater than or equal to MinOverlapCSMARegion in each Beacon Period with each NCo.
4. An optional rule may be to restrict the duration of Contention-Free Region of a BSS to a certain value. For example, if a BSS has two interfering neighbor BSSs, then the total duration of its Contention-Free Regions may be limited to 33% of the Beacon Period.

If Rules #1, #2, and #2 are used, then the scheduling policy is a First-Come-First-Served one.

Rule #3 is a form of admission control.

Transition between Different Neighbor Network Operation Modes

Figure 7:
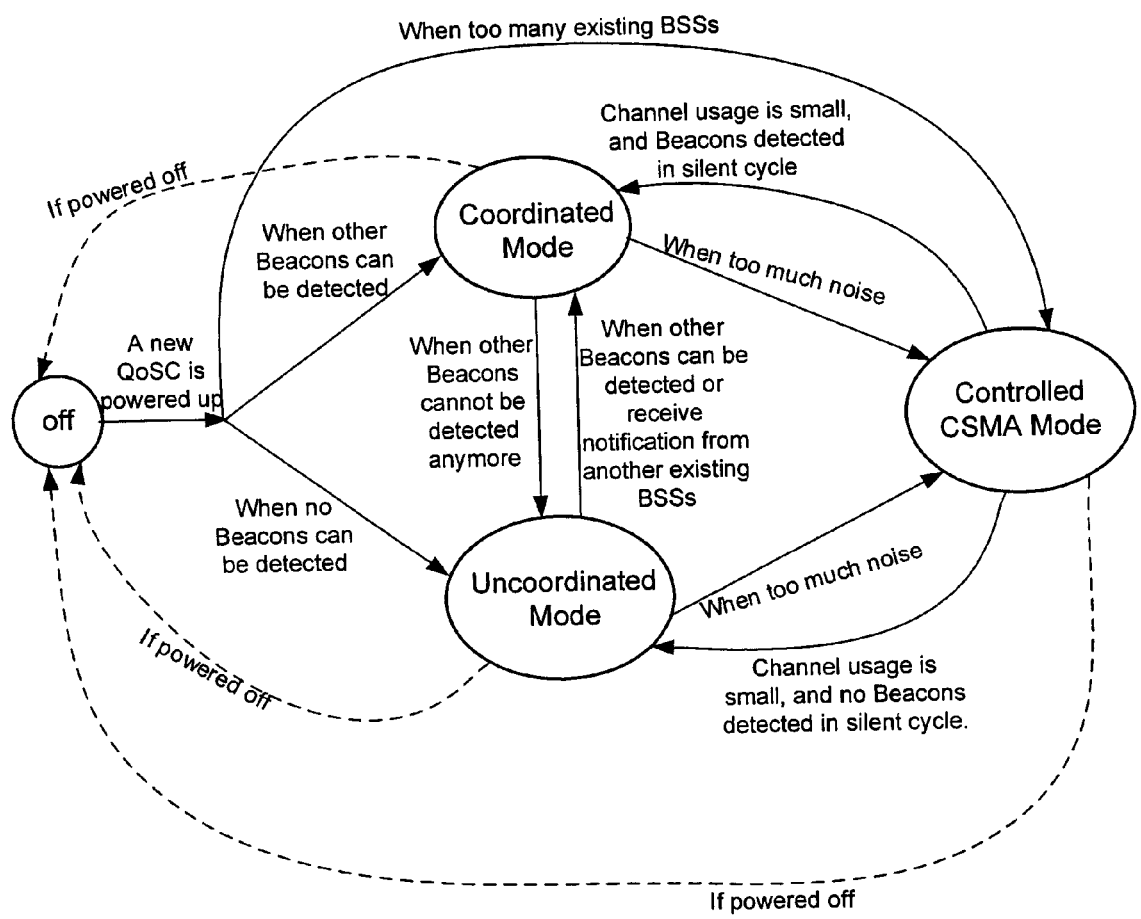
FIG. 7 is a chart depicting exemplary transitions between coordination modes.

A newly powered-up CCo shall either set up a BSS in the Uncoordinated Mode, Coordinated Mode, or CSMA Mode. An existing CCo shall transition to another mode if certain events have occurred. FIG. 7 shows a transition diagram between the three Neighbor Network operation modes. These transitions are described in the following sections.

From Coordinated Mode to Uncoordinated Mode

A CCo is in the Coordinated Mode because it can detect other Beacons. When the CCo no longer detects any other Beacons for MaxLostBeacon Beacon Periods in a row, it shall assume that all other BSSs have been powered off. The CCo shall then transition to the Uncoordinated Mode.

From Uncoordinated Mode to Coordinated Mode

A CCo is in the Uncoordinated Mode because it does not detect any other Beacons. When the CCo can now detect other Beacons (because, for example, another CCo has just established a new BSS), it shall transition to the Coordinated Mode. The CCo shall then set the Regions MMENTRY of its Beacon to make it compatible with the other BSSs.

Another possible trigger for a transition from the Uncoordinated Mode to the Coordinated Mode is when the CCo receives a Dummy Beacon message from another CCo. This can happen when the CCo has just established a new BSS in the Uncoordinated Mode. The CCo was not able to detect any existing BSSs because of interference, and therefore did not specify a Protected Region to protect the Beacon Region of an existing BSS. When the existing BSS receives the new Beacon from the CCo, the existing BSS shall send a Dummy Beacon message to announce its own existence. The (new) CCo shall then transition to the Coordinated Mode and specify a Protected Region to protect the Beacon Region of the existing BSS.

From Coordinated or Uncoordinated Mode to CSMA Mode

When the CCo finds that the noise level is too high and performance degrades for many Beacon Periods, it shall transition to the CSMA Mode. The CCo shall monitor the channel to determine the performance. For example, during a Contention-Free Region or a Protected Region, the CCo can check to see if the Frame Control of the SOF MPDU or the neighbor Beacon can be decoded correctly. If there are too many transmission errors, the CCo may first move the Contention-Free Region to another location. If the problem persists, it may want to transition to the CSMA Mode.

Provided that the number of BSSs is small, the transition to the CSMA Mode is expected to rarely happen because of the use of Protected Region to protect neighbor Beacons with a different timing. As long as the neighbor Beacons can be decoded correctly by each CCo, the CCos should be able to set the contents of their Beacons to eliminate collisions of Contention-Free Regions.

From CSMA Mode to Coordinated or Uncoordinated Mode

When the CCo is in the CSMA Mode, it shall monitor the channel to find out the average channel usage (e.g. number of successful transmissions) over a number of Beacon Periods. If the channel usage is high, it means there is a lot of traffic from its own stations and from stations in other BSSs. The CCo shall remain in the CSMA Mode.

When the CCo is in the CSMA Mode, it shall also schedule to stop all transmissions in its BSS once every N=TBD Beacon Periods. During that silent cycle, the CCo shall detect for neighbor Beacons.

If no Beacons are detected during the silent cycle and the channel usage is smaller than a threshold (TBD), then the CCo shall transition out of the CSMA Mode into the Uncoordinated Mode.

If neighbor Beacons are detected during the silent cycle and the channel usage is smaller than a threshold, the CCo shall transition to the Coordinated Mode by sending the NN_NEW_NET_REQ message to the NCos.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for managing network resources in the presence of interfering neighbor networks, said method comprising:
    a) coordinating communication between devices in a first network with a first Quality of Service Controller (QoSC) using a first coordination mode, wherein said QoSC is a controlling authority managing bandwidth allocation between network devices with a method comprising alternative usage of coordination modes comprising an uncoordinated mode wherein said first network is operated independent of potentially interfering networks, a coordinated mode wherein said first network's bandwidth is shared with interfering networks and a controlled mode wherein contention access protocols are used and wherein said first coordination mode is one of said coordination modes;
    b) switching from said first coordination mode to a second coordination mode of said coordination modes when an interfering beacon detection condition occurs in relation to a beacon from a second QoSC in a second network that interferes with said first network.

2. A method as described in claim 1 wherein said interfering beacon detection condition is the absence of a detectable beacon after a beacon has first been detected.

3. A method as described in claim 1 wherein said interfering beacon detection condition is the presence of a detectable beacon after an absence of a detectable beacon.

4. A method as described in claim 1 wherein said beacon detection condition is the inability to decode a Beacon message.

5. A method for managing network resources in the presence of interfering neighbor networks, said method comprising:
    a) coordinating communication between devices in a first network with a first Quality of Service Controller (QoSC) using a first coordination mode, wherein said QoSC is a controlling authority managing bandwidth allocation between network devices with a method comprising alternative usage of coordination modes comprising an uncoordinated mode wherein said first network is operated independent of potentially interfering networks, a coordinated mode wherein said first network's bandwidth is shared with interfering networks and a controlled mode wherein contention access protocols are used and wherein said first coordination mode is one of said coordination modes;
    b) detecting a beacon from a second QoSC with a second network that interferes with said first network;
    c) switching from said first coordination mode to a second coordination mode of said coordination modes in response to said detecting, wherein said second coordination mode coordinates network traffic in said first network and said second network.

6. A method as described in claim 5 wherein said second coordination mode is said coordinated mode comprising a contention-free period with allocations for connections between devices in said first network and for connections between devices in said second network.

7. A method as described in claim 5 wherein said second coordination mode is said controlled mode comprising a contention period wherein devices in said first network and said second network are prevented from transmission when a device in either of said first network or said second network has started, but not completed a transmission.

8. A method as described in claim 5 wherein said second coordination mode comprises a carrier sense multiple access (CSMA) mode, which allocates bandwidth to said first network and said second network.

9. A method for managing network resources in the presence of interfering neighbor networks, said method comprising:
    a) coordinating communication between devices in a first network and a second network with a first Quality of Service Controller (QoSC) and a second QoSC using a first coordination mode, wherein said first QoSC and said second QoSC are a controlling authorities managing bandwidth allocation between network devices with methods comprising alternative usage of coordination modes comprising an uncoordinated mode wherein said first network is operated independent of said second network, a coordinated mode wherein said first network's bandwidth and said second network's bandwidth are shared and a controlled mode wherein a contention access protocol is used for said first network and said second network and wherein said first coordination mode is one of said coordination modes;

b) detecting the absence of a beacon from said second QoSC with said first QoSC;

c) switching from said first coordination mode to a second coordination mode of said coordination modes with said first QoSC in response to said detecting, wherein said second coordination mode is said uncoordinated mode that does not account for traffic in said second network.

10. A method as described in claim 9 wherein said first communication mode is said coordinated mode and said second communication mode is said uncoordinated mode.

11. A method as described in claim 9 wherein said first coordination mode is said coordinated mode.

12. A method as described in claim 9 wherein said first coordination mode is said controlled mode.

* * * * *